(12) United States Patent
Adams et al.

(10) Patent No.: US 6,403,717 B1
(45) Date of Patent: Jun. 11, 2002

(54) ETHYLENE INTER-POLYMER BLENDS

(75) Inventors: James L. Adams, Somerset; George N. Foster, Bloomsbury; Robert H. Vogel, Ringoes; Scott H. Wasserman, Bridgewater, all of NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/614,901

(22) Filed: Jul. 12, 2000

(51) Int. Cl.$^7$ .................. C08L 23/00; C08L 23/04; C08L 25/02; C08L 45/00
(52) U.S. Cl. .................. 525/191; 525/210; 525/216; 525/240; 525/241
(58) Field of Search .................. 525/191, 210, 525/216, 240, 241

(56) References Cited

U.S. PATENT DOCUMENTS

| | | |
|---|---|---|
| 4,521,437 A | 6/1985 | Storms |
| 5,272,236 A | 12/1993 | Lai et al. |
| 5,288,531 A | 2/1994 | Falla et al. |
| 5,360,648 A | 11/1994 | Falla et al. |
| 5,408,004 A | 4/1995 | Lai et al. |
| 5,656,696 A | 8/1997 | Yamamoto et al. |
| 5,741,861 A | 4/1998 | Yamamoto et al. |
| 5,798,427 A | 8/1998 | Foster et al. |
| 5,852,143 A | 12/1998 | Sishta et al. |
| 5,874,139 A | 2/1999 | Bosiers et al. |
| 5,998,558 A | 12/1999 | Wasserman et al. |
| 6,159,617 A | * 12/2000 | Foster et al. ............. 428/523 |

FOREIGN PATENT DOCUMENTS

EP 0 601 495 A2 6/1994

OTHER PUBLICATIONS

Ching–Tai Lue, Easy Processing Metallocene Polyethylene, 1998, Annu. Tech. Conf.—Soc. Plast. Eng., 56$^{th}$ (vol. 2), Baytown, Texas.

* cited by examiner

*Primary Examiner*—Nathan M. Nutter
(74) *Attorney, Agent, or Firm*—Univation Technologies

(57) ABSTRACT

Blend compositions of ethylene inter-polymers have equal or improved processability when compared to blends of high pressure produced polyethylenes (HP-LDPE) and linear low density ethylene inter-polymers (HP-LDPE/LLDPE). Additionally, the blends of ethylene inter-polymers have superior optical and physical properties to the HP-LDPE/LLDPE blends.

The ethylene inter-polymer blends include a first ethylene inter-polymer having, an nRSI greater than 26, a PDI of greater than 3, or less than 15, a CCLDI greater than 1.0, or less than 10.0, and a branching factor less than 0.7. These inter-polymer blends also include a second ethylene inter-polymer that has an nRSI of greater than 1 or less than 11, a PDI of greater than 1.5 or less than 6, a CCLDI greater than 1 or less than 20, and a branching factor greater than factor 0.70, or less than 1.

17 Claims, 2 Drawing Sheets

ETHYLENE INTER-POLYMER BLENDS

FIELD OF THE INVENTION

This invention relates generally to ethylene polymer blends. The ethylene polymer blends will have superior processability compared to generally linear polyethylenes, while providing improved physical properties over prior blends.

BACKGROUND OF THE INVENTION

Since the wide acceptance of linear ethylene polymers, especially lower-density ethylene inter-polymers with incorporated linear or branched olefin comonomers, commonly called, Linear Low density Polyethylenes (LLDPE) or Very Low Density Polyethylene (VLDPE), their physical property attributes, such as toughness, have been recognized extensively.

However, for both Ziegler-Natta (Z-N LLDPE or Z-N VLDPE) and metallocene catalyst (mLLDPE or mVLDPE) catalyzed ethylene inter-polymers, their melt processing, most notably their film extrusion, is somewhat difficult, especially as compared to products which came before, such as branched High Pressure produced Low-Density Polyethylenes (HP-LDPE). This difficulty has led manufacturers of melt extruded films or molded articles to blend the more easily processed ethylene polymers, usually highly long-chain branched HP-LDPE, into the LLDPEs.

However, as with many such compromises, gaining processability with the addition of amounts of HP-LDPE generally leads to a lowering of physical properties of such blends, when compared to the physical properties of either mLLDPE or Z-N LLDPE materials by themselves.

There is a commercial need therefore for an ethylene inter-polymer composition that can equal or exceed the processability of HP-LDPE blends while offering improved physical and optical properties over the HP-LDPE/LLDPE blends.

SUMMARY OF THE INVENTION

We have discovered that when a metallocene catalyst-produced first ethylene inter-polymer with narrow to medium molecular weight distribution (MWD), also known as polydispersity index or PDI, a narrow comonomer composition and controlled levels of long chain branching (LCB), is blended with a second ethylene inter-polymer (e.g. one or more of Z-N LLDPE, mLLDPE, Z-N VLDPE, mVLDPE), the resulting ethylene inter-polymer blend composition has lower melt viscosity, improved optical properties and improved physical properties, when compared to HP-LDPE blends with LLDPE.

These blends deliver the desired processability, equaling or exceeding the processability of HP-LDPE/LLDPE blends.

In other embodiments, an ethylene inter-polymer blend composition is contemplated, comprising greater than 1 weight percent of at least one first ethylene inter-polymer, the first ethylene inter-polymer, having a branching factor of greater than 0.4 or less than 0.7, a polydipersity index, (PDI) ratio of weight average molecular weight to number average molecular weight) greater than 3 or less than 15, and a normalized relaxation spectrum index (nRSI), as definded below greater than 26 and a Crystallizable Chain Length Distribution Index (CCLDI), the CCLDI as described in U.S. Pat. No. 5,789,427 ('427) incorporated herein by reference, of greater than 1.0 or less than 10.0.

Additionally, the ethylene interpolymer blend is comprised of less than 99 weight percent of at least one second ethylene inter-polymer, the second ethylene inter-polymer having a branching factor greater than 0.7, a PDI greater than 1.5 or less than 6, normalized relaxation spectrum index nRSI greater than 1 or less than 11, and a CCLDI greater than 1 or less than 20.

In further embodiments, a film made from the ethylene inter-polymer blends is contemplated to have superior optics and superior toughness. The film may have a dart drop impact greater than 100 g/mil, the film may have a haze less than or equal to 7% any may have a Elmendorf tear in the machine direction (MD) greater than 80 g/mil. All three of these properties and values may be found in the films simultaneously.

The polymer blend compositions described in this invention can be produced by post reactor blending, of two or more components, produced in staged reactors, in a single reactor via mixed catalysts, or combinations of these techniques.

BRIEF DESCRIPTION OF THE DRAWINGS

The foregoing aspects, features, and advantages of the invention will become clearer and more fully understood when the following detailed description is read in conjunction with the accompanying drawing, in which.

DESCRIPTION

Figure 1:
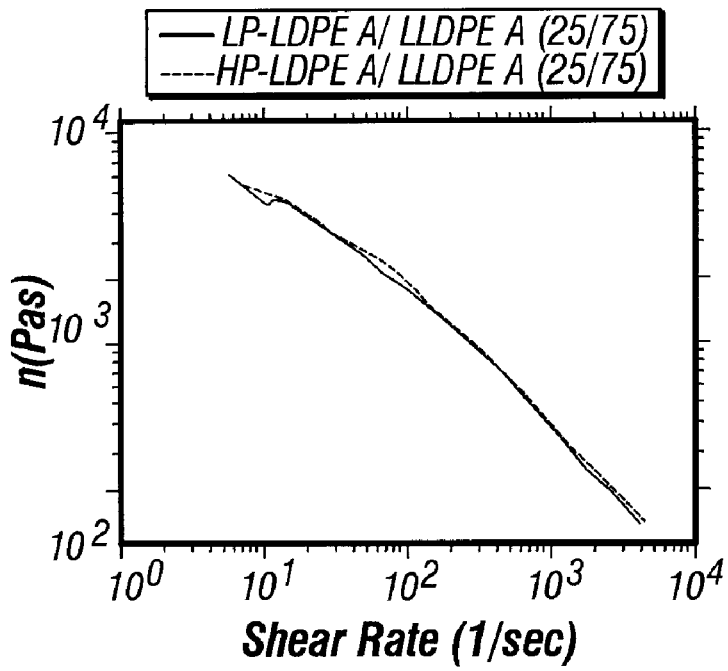
FIG. 1 shows Capillary Rheometry data for 2 blends, one conventional HP-LDPE A/LLDPF A (25/75) and one embodiment of our invention, a long-chain branched ethylene inter-polymer or Low Pressure (LP)-LDPE A/LLDPE A (25/75).

Various embodiments of our invention concern certain ethylene inter-polymer blend compositions, films or fabricated articles such as injection or blow molded containers, extruded pipe, extruded profiles and wire and cable coatings made from these compositions, and their uses. These blend compositions exhibit improved processability, equal to or greater than HP-LDPE/LLDPE blends, and articles made from these blend compositions exhibit improved optical properties and improved physical properties, when compared to previous blends of either linear polyethylenes or linear ethylene inter-polymers and highly branched polyethylenes, such as high pressure low density polyethylene.

A detailed description of these blend compositions and the ethylene inter-polymers that comprise them follow.

Those of skill in the art will appreciate that numerous modifications to these preferred embodiments can be made without departing from the scope of the invention. For example, although various properties of branched polymers combined with one or more of mLLDPE or mVLDPE and Z-N LLDPE or Z-N VDLPE, are used to exemplify the attributes and materials of the present composition, the blend composition may include other components and the blend composition may be used as one or more layers of a multi-layer film or fabricated article. To the extent that our description is specific, this is solely for the purpose of illustrating preferred embodiments of our invention and should not be taken as limiting our invention to these specific embodiments.

The compositions and fabricated articles included in embodiments of our invention may include additives that are frequently found in such compositions, including, but not limited to anti-block, slip, processing aids, anti-stat, anti-ozinants, anti-oxidants, colors, and the like. Additional materials may be added to the compositions, so long as the characteristic improvements in physical properties outlined herein are not substantially compromised.

The use of subheadings in the description is intended to assist the reader and is not intended to limit the scope of our invention in any way.

Ethylene Inter-Polymer With Controlled Branching

We contemplate at least a first ethylene inter-polymer (as described in '427) with controlled levels of long chain branching, as well as narrow to medium Molecular Weight Distribution (MWD) and narrow composition of comonomer as indicated by CCLDI. By very narrow MWD we intend a polydispersity index (PDI) <3, narrow 3–<5, medium 5–<15 and broad greater than 15. The PDI of the present first ethylene inter-polymer, uncorrected for long chain branching, is greater than 3, or greater than 4, or less than 15 or less than 12. or less than 10.

Additionally, the CCLDI is greater than 1.0 or greater than 1.2, or greater than 1.5, or less than 10.0, or less than 5.0, or less than 3.0. CCLDI is used to describe comonomer distribution or compositional homogeneity. The present first ethylene inter-polymers, from the above numbers, are said to have relatively narrow comonomer distribution and/or to be relatively homogeneous in compositional distribution.

In the '427 document, the relaxation spectrum index, RSI parameter is discussed, and a relation comprising RSI and melt index (MI) is used to define in part that invention, while the normalized form nRSI is defined as $RSI*(MI)^\alpha$, where $\alpha=0.74$. For purposes of this specification, nRSI of this first ethylene inter-polymer is greater than 26, or greater than 28. or greater than 30, or greater than 32. In general, nRSI is indicative of ease of processability of a polymer; the higher the its value, the better the processability.

While branching is discussed in the '427 and '558 documents, the effects of branching are not limited to those discussed therein.

The presence of long-chain branching, in an ethylene polymer or ethylene inter-polymer is also manifested in its intrinsic viscosity, $[\eta]$ when compared with its linear analogue at similar weight average molecular weight, zero shear viscosity or melt index.

Intrinsic Viscosity Vs $\log_{10}$ Melt Index

One methodology used to characterize polymers with rheologically active LCB makes use of the polymer-type discrimination capabilities seen in plots of intrinsic viscosity $[\eta]$ versus $\log_{10}$ melt index (MI). This empirical characterization technique is described in an article by H. M. Quackenbos in The Journal of Applied Polymer Science, Vol. 13, pp 341–351 (1969), incorporated herein by reference.

Figure 3:
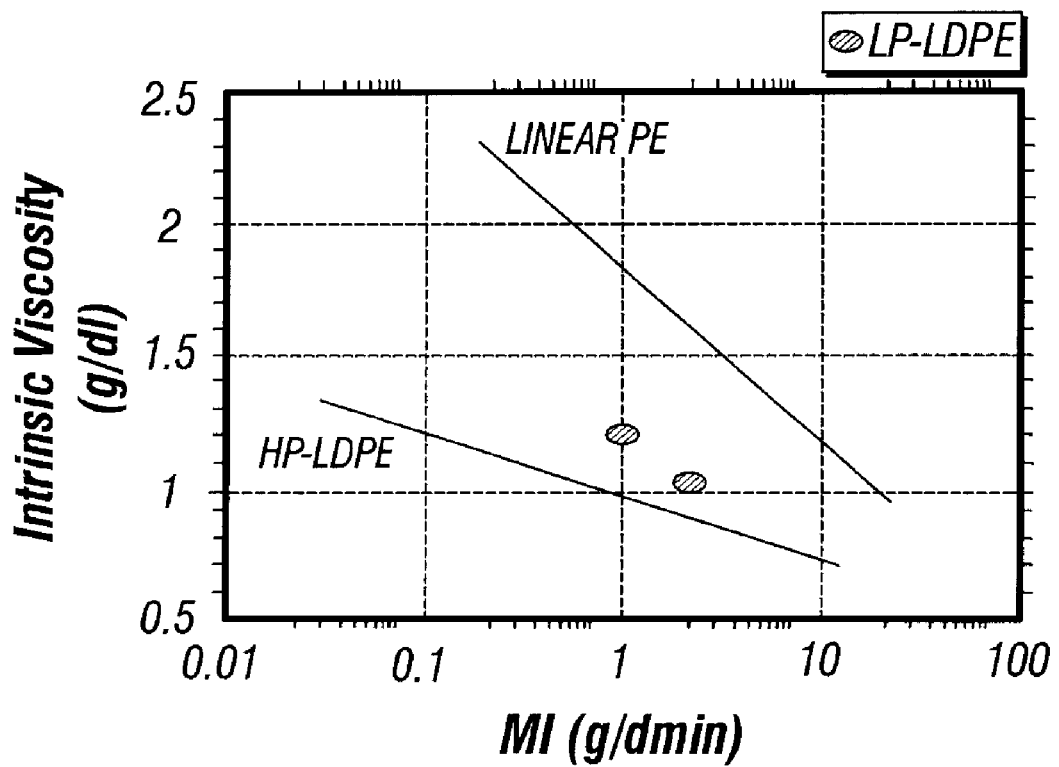
FIG. 3 shows Intrinsic Viscosities of Linear PE, HP-LDPE and LP-LDPE.

Applying, the principle of H. M. Quackenbos, the structure discriminating capability of the $[\eta]$ versus $\log_{10}$ MI plot is shown in FIG. 3. The intrinsic viscosities of LP-LDPE or first branched ethylene inter-polymer component present in the blend compositions described herein are shown to be intermittent to those of linear ethylene inter-polymers and HP-LDPE as shown in FIG. 3.

These effects can be normalized with respect to melt index to provide a characterization index which discriminates polymer types based on levels of rheologically-active LCB.

The Branching-Factor ($G_v$)

FIG. 3 represents a plot of log melt index (MI), measured at 190° C. ASTM D-1238-95 versus intrinsic viscosity. $[\eta]$, measured in Decalin at 135° C. for a wide range of linear ethylene inter-polymers versus that representing a series of HIP-LDPE having substantial LCB content. An index, $G_v$ (G-factor) (the G factor for purposes of this specification will be analogous to branching factor) is derived from the $\log_{10}$ MI Vs $[\eta]$ plot as:

$$G_v = [\eta]_{BR,MI}/[\eta]_{LN,MI}$$

where $[\eta]_{BR,MI}$ is the experimentally measured intrinsic viscosity of a sample of melt index MI. $[\eta]_{LN,MI}$ is the calculated intrinsic viscosity as defined from the relationship of $[\eta]$ vs. log MI for linear PE—i.e. $[\eta]_{LN,MI} = -0.699*\text{Log MI} + 1.851$. To calculate $G_v$, we measure the intrinsic viscosity and melt index for a sample, then compute, for the measured MI, what the linear $[\eta]$ would be. We then normalize the measured $[\eta]_{BR,MI}$ by dividing using the linear $[\eta]_{LN,MI}$ value to give $G_v$, analogous to the calculation of G' from intrinsic viscosity and molecular weight (viscosity average) parameters.

This G-factor parameter, $G_v$, is sensitive to the presence of rheologically-active LCB. As such, the G-factor reflects LCBs that matter to resin processability and is relatively insensitive to molecular weight distribution, as reflected by PDI or $M_w/M_n$.

The more linear, or less branched ethylene inter-polymers have a branching factor approaching the theoretical limit 1. For the first ethylene inter-polymers of embodiments of our invention, the branching factor is generally greater than 0.4, or greater than 0.5, and generally less than 0.7.

Second Ethylene Inter-Polymers

Among the contemplated second ethylene inter-polymers are linear low density polyethylenes or very low density polyethylenes, which may be Ziegler-Natta (Z-N) LLDPF or Z-N VLDPE, metallocene (mLLDPE) or mVLDPE, or other transition-metal catalyzed ethylene inter-polymers. In other embodiments of our invention, combinations of second ethylene inter-polymers are also contemplated, as long as the two or more second ethylene inter-polymers have polymer properties outlined herein. Similarly the first ethylene inter-polymers of embodiments of our invention may be combinations of first ethylene inter-polymers as long as the two or more first ethylene inter-polymers have polymer properties outlined herein.

Generally these ethylene inter-polymers, alternatively described as "second ethylene inter-polymers" for purposes of this specification, will predominate in the blends of embodiments of our invention. Their presence in the blend composition will generally be greater than 50%, although smaller percentages such as 40% or lower are not precluded. Generally these second ethylene inter-polymers will be present in the blends at greater than 50, or greater than 55, or greater than 60, or greater than 65, or greater than 70 weight percent and/or less than 99, or less than 95, or less than 90, or less than 85 weight percent, based on the total weight of the composition. The balance of the blends will generally be made up of the first ethylene inter-polymers described above.

In each instance, these second ethylene inter-polymers exhibit excellent physical properties. Their melt processability, especially in the extrusion of film, is relatively difficult. This difficulty takes the forms of higher motor loads, higher torque requirements, higher head pressures, for extrusion, as well as diminished bubble stability in blown films and combinations thereof.

These second ethylene inter-polymers will generally have a branching factor greater than 0.7 or greater than 0.8, or greater than 0.9, or greater than 0.95, or less than 1; although on an actual laboratory measurement, the number may slightly exceed 1 based of the experimental error in the measurements of intrinsic viscosity and that of melt index.

The second ethylene inter-polymers will have a CCLDI greater than 1, or greater than 1.8, or less than 20, or less than 15. The nRSI of those second ethylene inter-polymers having a $G_v$ greater than 0.9 will generally be greater than 1, or greater than 1.8 or less than 5.5; and those ethylene inter-polymers having a $G_v$ generally greater than 0.9, will generally have a PDI greater than 2.0, or greater than 4.0, or less than 6.0. The nRSI of those ethylene inter-polymers polymers having a $G_v$ generally greater than 0.7, will generally be greater than 1.8, or less than 11; and those ethylene inter-polymers polymers having, a $G_v$ generally greater than 0.7, will generally have a PDI greater than 2.0 or less than 4.0.

In general the second ethylene inter-polymers can be characterized by a PDI greater than 1.5 or less than 6.0. and an nRSI greater than 1, or greater than 1.8, or less than 11.

Ethylene polymers included in embodiments of our invention include ethylene homopolymers, and inter-polymers of ethylene and linear or branched higher alpha-olefins containing 3 to 20 carbon atoms, with densities greater than 0.90 and/or less than 0.95 g/cm$^3$ and melt indices of greater than 0.1 and/or less than 200 g/10 min. Suitable higher alpha-olefins include, for example, propylene, 1-butene, 1-pentene, 1-hexene, 4-methyl-1-pentene, 1-octene, 3,5,5-trimethyl 1-hexene and combinations thereof. Cyclic olefins such as vinyl cyclohexane or norbornene may also be polymerized with the ethylene and or one or more α-olefins. Aromatic compounds having vinyl unsaturation, such as styrene and substituted styrenes, may also be included as comonomers with one or more of the monomers discussed above. Particularly preferred ethylene polymers comprise ethylene and 1–40 percent by weight of one or more comonomers described above.

The RSI, CCLDI, PDI and branching factor of various polyethylenes are described as follows:

|  | nRSI[1] | Branching Factor[2] | CCLDI | PDI |
|---|---|---|---|---|
| Ziegler-Natta LLDPE | 3–4.5 | >0.95 | 10–20 | 3.5–5.5 |
| Metallocene LLDPE (as described in U.S. Ser. No. 08/611,278 examples) | 1.8–5.5 | 0.9–1.0 | 1–10 | 2.5–5 |
| Metallocene LLDPE (U.S. Pat. No. 5,998,558) | 8–11 | 0.73–0.77 | 2–4 | 3.0–5.3 |
| Metallocene LLDPE (Dow) (Affinity ®) | 5.5–6.5 | 0.77–0.81 | 1–2 | 1.8–2.4 |
| HP-LDPE | 13–21 | 0.2–0.6 | | |
| First ethylene inter-polymer (made according to U.S. Pat. No. 5,798,427) | >24 | 0.4–0.7 | 1.5–10 | 3–15 |

[1]Where nRSI = RSI*(MI)$^\alpha$ where α = 0.74
[2]$G_v$ or branching factor

As discussed above, a usual way of addressing some of the drawbacks found in processing linear ethylene inter-polymers, is to blend in 5–40% HP-LDPE, or 10–30%, or 20–30%, into the linear ethylene interpolymers. While this reduces or eliminates some of these processing problems, such additions usually diminish the desirable physical properties of the linear polyethylenes such as tear resistance, tensile strength dart drop impact. Further, the addition of HP-LDPE to linear ethylene inter-polymers tends to improve upon the clarity of the linear ethylene inter-polymers.

The addition of branched ethylene inter-polymers (first ethylene inter-polymers of embodiments of the present invention) tends to improve processability in a similar manner as the addition of HP-LDPE by adding branching to the blend composition. However, the mechanical properties do not suffer nearly as much as when a HP-LDPE is added to LLDPE.

Properties of Blends

Figure 2:
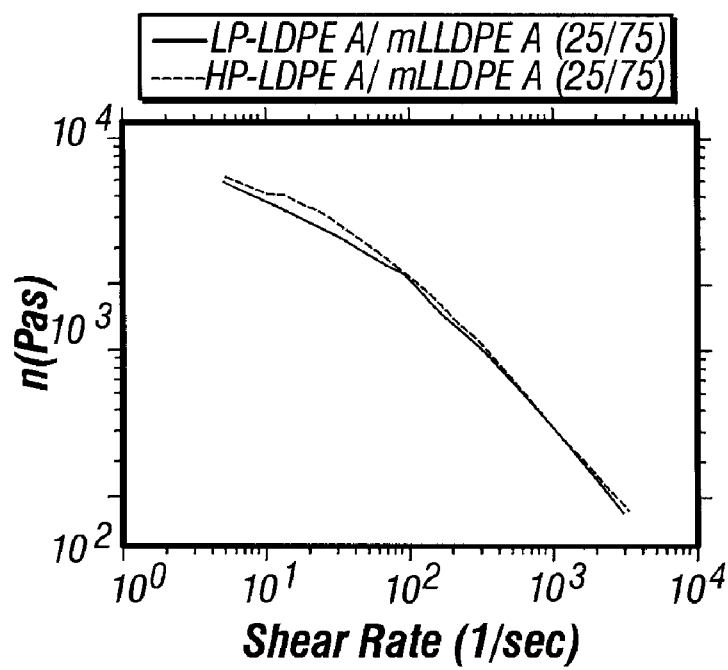
FIG. 2 shows Capillary Rheometry data for 2 blends, one conventional HP-LDPE A/mLLDPE A (25/75) and one embodiment of our invention LP-LDPE A/mLLDPE A (25/75).

Capillary viscometry measurements can be a good predictor of the melt extrudability/processability of polymers. FIGS 1 and 2 show comparisons of the shear viscosity for representative examples of the blends of this invention. These are compared to a blend of HP-LDPE/Z-N LLDE (FIG. 1) and a blend of HP-LDPE/metallocene LLDPE/ metallocene LLDPE (FIG. 2) over a wide range of shear rates. As is disclosed in the comparisons, the ethylene inter-polymers described in this invention have shear viscosities in the processing shear rate region of above 500 and/or below 1000 s-1, that are equivalent to or less than that for blends of HP-LDPE/LLDPE. These shear viscosity results indicate that the ethylene inter-polymer compositions described in this invention have equivalent-to-better melt extrudability compared to HP-LDPE/LLDPE blends with equal amounts of the majority component, LLDPE. The combination of the melt rheology results, with the intrinsic tear resistance and tensile results (described in Table 3), indicates that the ethylene inter-polymer compositions described in this invention have an enhanced combination of processability and toughness over that of comparable HP-LDPE/LLDPE blends.

Improved properties of the blends according to embodiments of our invention, include film properties such as dart drop impact resistance, haze and Elmendorf tear, machine direction (MD).

The dart drop impact, as measured by ASTM D-1709, will be greater than 100 g/mil, or greater than 200 mil, or greater than 300 g/mil.

The haze, as determined by ASITM D-1003, will be less than or equal to 7%, or less than equal to 6%, or less than or equal to 5%, or less than or equal to 4%.

The Elmendorf tear (MD), as measured by ASTM D-1922, will be greater than 80 g/mil, or greater than 110 g/mil, or greater than 130 g/mil.

While the blend proportions are described above, additional blend components are contemplated as long as the physical properties discussed above are obtained. Such blend components may include other polyethylenes.

EXAMPLES

In the examples that follow, the various polyethylenes are described as follows:

| Polyethylene | MI (dg/min) | Density (g/cm³) | nRSI[4] | CCLDI | PDI | Branching Factor | IV (dl/g) |
|---|---|---|---|---|---|---|---|
| HP-LDPE A (DYNH-1) (Union Carbide) | 1.7 | 0.921 | 18.5 | 1.7 | 4.4 | 0.59[3] | 0.990 |
| LLDPE A (Z-N LLDPE) (HS-7028 Union Carbide) | 1.0 | 0.918 | 4.8 | 14 | 4.8 | ND but estimated >0.95[1] | ND |
| LP-LDPE A[2] (polyethylene made according to '427 patent) | 2 | 0.920 | 37 | 1.4 | 6.6 | 0.67 | 1.102 |
| LP-LDPE B (polyethylene made according to '427 patent) | 0.7 | 0.920 | 54 | 1.7 | 9.1 | ND | ND |
| MLLDPE A (polyethylene made according to U.S. Pat. No. 5,324,800) | 1.0 | 0.917 | 2.2 | 4.5 | 2.5 | ND but est. >0.95 | ND |
| MlldPE B (polyethylene made according to U.S. Pat. No. 5,324,800) | 0.75 | 0.925 | 1.8 | 4.4 | 2.7 | 1.06 | 2.060 |

[1]Representative value for HS-7028
[2]Data from a 2.2 MI product of the same catalyst
[3]Determined on measurements in decalin at 135° C.
[4]Where nRSI = RSI*(MI)$^\alpha$ where $\alpha$ = 0.74

Runs 1–7 were melt blended. The blends were extruded into blown film on a 1.5 (3.8) inch (cm) extruder fitted with a 2 (5.1) inch (cm) die, and a single lip air ring Runs 8–12 were run as in runs 1–7.

As can be seen from Table 1 (Runs 1–7), Runs 5, 6, and 7 at LP-LDPE A/LLDPE A blend compositions 25/15, 5/95, and 10/990, respectively, have haze values that are sufficient to give them applicability in most "clarity" applications. Dart drop on the other hand is substantially higher in Runs 5 and 6 as compared to their HIP-LDPE blend analogs, Runs 2 and 4 respectively, as is the Elmendorf tear as well. These data indicate that for a similar blend with HP-LDPE, the LLDPE A blends with LPLDPE A are far superior in physical properties.

Table 2 contains data on blends of LP-LDPE A and HP-LDPE A both with linear mLLDPE A, (9-12) and (10-11). The results show that the addition of LP-LDPE A to mLLDPE offers a comparable improvement in optical properties mLLDPE blends with HP-LDPE Aided.

The improved properties of blends of embodiments of our invention along with product characterization parameters, are shown in Table 3. For the intrinsic tear measurements, 5 mil plaque samples are compression-molded. Conventional Z-N LLDPEs have an intrinsic tear value of 598 g/mil (Run 13) which drops to 190 g/mil for blends with 5% HP-LDPF (Run 14). In comparison, blend composition of 5% LP-LDPE A and 95% LLDPE A ((Run 18) has intrinsic tear resistance that shows only a moderate decrease in the intrinsic tear (558 g/mil). Even the 50–50 blend of LLDPE-A and LP-LDPE A (Run 21) has superior intrinsic tear resistance to that of the Run 14 (364 vs. 192 g/mil). The decrease in intrinsic tear resistance for LLDPE-A blends with increasing LP-LDPE-A content, is significantly less severe than that encountered with the addition of HP-LDPE. The ethylene inter-polymer compositions in this invention provide improved combination of processability and inherent toughness.

Overall, the ethylene inter-polymer compositions described in this invention, provide equivalent- to better processability compared to conventional HP-LDPE/LLDPE blends, while also providing improved toughness. The improvements are inherent to the molecular structural properties and are maintained during melt processing into extruded blown film.

While the present invention has been described and illustrated by reference to particular embodiments thereof, it will be appreciated by those of ordinary skill in the art that the invention lends itself to variations not necessarily illustrated herein. Reference should be made solely to the appended claims for purposes of determining the true scope of the present invention.

TABLE 1

| | | | Blown Film Properties | | | | |
|---|---|---|---|---|---|---|---|
| Run | 1 | 2 | 3 | 4 | 5 | 6 | 7 |
| LP-LDPE A Blends | LLDPE | 94-2A | 94-3A | 94-4A | 94-5A | 94-6A | 94-7A |
| Blend Composition | | 5/95 HP-LDPE A/ LLDPE A | 50/50 LP-LDPE A/ LLDPE A | 25/75 HP-LDPE A/ LLDPE A | 25/75 LP-LDPE A/ LLDPE A | 5/95 LP-LDPE A/ LLDPE A | 10/90 LP-LDPE A/ LLDPE A |
| Optical Properties | | | | | | | |

TABLE 1-continued

Blown Film Properties

| Run<br>LP-LDPE A Blends | 1<br>LLDPE | 2<br>94-2A | 3<br>94-3A | 4<br>94-4A | 5<br>94-5A | 6<br>94-6A | 7<br>94-7A |
|---|---|---|---|---|---|---|---|
| Haze (%) | 8.0 | 2.3 | 6.7 | 6.4 | 4.7 | 5.7 | 5.3 |
| Clarity | 93.8 | 94.1 | 93.9 | 93.6 | 94.5 | 93.7 | 93.7 |
| Gloss (45°) | 59.2 | 78.1 | 62.9 | 65.7 | 70.8 | 67.9 | 70.3 |
| Impact Properties | | | | | | | |
| Dart Drop (g/mil) | 146 | 73 | 86 | 77 | 131 | 112 | 134 |
| Elmendorf Tear (g/mil) | | | | | | | |
| MD | 382 | 26 | 68 | 95 | 133 | 330 | 330 |
| TD | 975 | 606 | 1,026 | 1,048 | 1,025 | 966 | 911 |
| Puncture Resistance (in.lb/mil) | 21 | 22 | 19 | 18 | 20 | 20 | 21 |
| Tensile Impact (ft.lb/cu.in) | | | | | | | |
| MD | 1,600 | 1,044 | 802 | 778 | 1,290 | 1,621 | 1,505 |
| TD | 1,252 | 588 | 1,175 | 1,199 | 1,293 | 1,388 | 1,303 |
| Tensile Properties | | | | | | | |
| Secant Modulus, psi | | | | | | | |
| MD | 28,948 | 30,646 | 35,475 | 34,683 | 31,015 | 30,551 | 32,808 |
| TD | 31,887 | 40,958 | 48,215 | 46,625 | 37,846 | 40,720 | 39,923 |
| Tensile Strength (psi) | | | | | | | |
| MD | 7,144 | 6,530 | 6,721 | 6,219 | 6,601 | 7,368 | 6,819 |
| TD | 5,576 | 4,670 | 5,209 | 5,129 | 5,365 | 5,656 | 5,049 |

TABLE 2

Blown Film properties

| Run | 8 | 9 | 10 | 11 | 12 |
|---|---|---|---|---|---|
| LP-LDPE A Blends | | | | | |
| Sample | mLLDPE<br>96-1A | 96-2A<br>81-11 | 96-3A<br>81-10 | 96-4A<br>81-4 | 96-5A<br>81-5 |
| Blend Composition | 100 | 25/75<br>LP-LDPE A/<br>mLLDPE A | 5/95<br>LP-LDPE A/<br>mLLDPE A | 5/95<br>HP-LDPE A/<br>mLLDPE A | 25/75<br>HP-LDPE A/<br>mLLDPE A |
| Optical Properties | | | | | |
| Haze (%) | 6.5 | 3.0 | 3.0 | 2.1 | 2.1 |
| Clarity | 95.0 | 94.4 | 95.0 | 94.5 | 94.9 |
| Gloss (45°) | 63.9 | 77.9 | 78.6 | 84.5 | 84.6 |
| Impact Properties | | | | | |
| Dart Drop (g/mil) | 433 | 350 | 464 | 613 | 163 |
| Elmendorf Tear (g/mil) | | | | | |
| MD | 264 | 88 | 188 | 117 | 132 |
| TD | 516 | 638 | 572 | 582 | 572 |
| Puncture Resistance (in.lb/mil) | 22 | 21 | 22 | 22 | 23 |
| Tensile Impact (ft.lb/cu.in) | | | | | |
| MD | 2,017 | 1,224 | 1,785 | 1,727 | 440 |
| TD | 2,088 | 1,767 | 1,916 | 1,971 | 1,651 |
| Tensile Properties | | | | | |
| Secant Modulus, psi | | | | | |
| MD | 24,008 | 30,063 | 27,312 | 29,059 | 29,009 |
| TD | 29,120 | 37,184 | 30,417 | 36,648 | 38,352 |
| Tensile Strength (psi) | | | | | |
| MD | 7,417 | 7,244 | 7,954 | 7,255 | 6,659 |
| TD | 5,481 | 5,706 | 6,536 | 6,580 | 6,097 |

TABLE 3

Product Characterization

| Run | 13 | 14 | 15 | 16 | 17 | 18 | 19 | 20 |
|---|---|---|---|---|---|---|---|---|
| 20131 | 81-1 | 81-2 | 81-3 | 81-4 | 81-5 | 81-6 | 81-7 | 81-8 |
| Composition | 100/0 | 5/95 | 25/75 | 5/95 | 25/75 | 5/95 | 10/90 | 25/75 |
| Components | LLDPE A | HP-LDPE A/ LLDPE A | HP-LDPE A/ LLDPE A | HP-LDPE A/ mLLDPE A | HP-LDPE A/ mLLDPE A | LP-LDPE A/ LLDPE A | LP-LDPE A/ LLDPE A | LP-LDPE A/ LLDPE A |
| MI (dg/min) | 0.85 | 1.01 | 0.93 | 0.98 | 0.92 | 0.86 | 0.86 | 0.90 |
| Density (extrudate) g/cm$^3$ | 0.9186 | 0.9197 | 0.9202 | 0.9188 | 0.9195 | 0.9192 | 0.9196 | 0.9203 |
| MFR | 28.0 | 25.1 | 29.3 | 16.7 | 20.0 | 29.4 | 31.3 | 35.5 |
| PDI | 5.3 | 5.0 | 5.1 | 2.8 | 3.2 | 5.6 | 5.2 | 5.3 |
| RSI | 4.9 | 4.8 | 7.2 | 2.3 | 4.3 | 5.5 | 6.1 | 7.2 |
| NRSI | 4.5 | 4.8 | 6.9 | 2.3 | 4.0 | 5.0 | 5.5 | 6.8 |
| Intrinsic Tear (g/mil) | 598 | 192 | 188 | 389 | 460 | 558 | 604 | 547 |
| Tensile Impact (ft-lb/in$^3$) | 1263 | 449 | 364 | 1657 | 1544 | 1113 | 1223 | 1075 |
| Tm1 (° C.) | 123.6 | 121.7 | 121.3 | 119.1 | 118.8 | 123.9 | 123.5 | 123.4 |
| Tm2 (° C.) | | 110.2 | 106.9 | 108.5 | 107.1 | 115 | 113 | 110.4 |
| ΔHf (cal/g) | 33.6 | 31.6 | 32.4 | 32.2 | 30.8 | 32.8 | 25.2 | 33.9 |
| CCLDI | 14.1 | 9.2 | 8.2 | 4.5 | 4.7 | 13.1 | 12.7 | 11.9 |

| Runs | 21 | 22 | 23 | 24 | 25 | 26 | 27 | 28 | 29 |
|---|---|---|---|---|---|---|---|---|---|
| Composition | 50/50 | 5/95 | 25/75 | 5/95 | 25/75 | 5/95 | 25/75 | 5/95 | 25/75 |
| Components | LP-LDPE A/ LLDPE A | LP-LDPE A/ mLLDPE A | LP-LDPE A/ mLLDPE A | LP-LDPE B/ LLDPE A | LP-LDPE B/ LLDPE A | LP-LDPE B/ mLLDPE A | LP-LDPE B/ mLLDPE A | LP-LDPE A/ mLLDPE B | LP-LDPE A/ mLLDPE B |
| MI (dg/min) | 0.97 | 1.04 | 1.11 | 0.86 | 0.87 | 0.87 | 0.92 | 0.74 | 0.70 |
| Density (extrudate) g/cm$^3$ | 0.9220 | 0.9188 | 0.9207 | 0.9188 | 0.9200 | 0.9187 | 0.9197 | 0.9261 | 0.9263 |
| MFR | 54.5 | 17.4 | 21.1 | 29.5 | 34.8 | 34.7 | 20.5 | 17.5 | 21.9 |
| PDI | 6.3 | 2.8 | 3.7 | 5.4 | 6.1 | 3.0 | 3.6 | 3.0 | 4.6 |
| RSI | 15.1 | 2.7 | 3.7 | 5.3 | 7.2 | 2.4 | 3.6 | 3.0 | 4.6 |
| NRSI | 14.8 | 2.8 | 4.0 | 4.8 | 6.6 | 2.2 | 3.4 | 2.5 | 3.7 |
| Intrinsic Tear (g/mil) | 364 | 348 | 373 | 464 | 458 | 374 | 343 | 335 | 262 |
| Tensile Impact (ft-lb/in$^3$) | 931 | 1805 | 1605 | 1166 | 1106 | 1790 | 1743 | 1511 | 1309 |
| Tm1 (° C.) | 122.0 | 119.2 | 119.7 | 124.5 | 123.9 | 119.9 | 120.0 | 122.9 | 122.7 |
| Tm2 (° C.) | 108.3 | 108.8 | 108.7 | 116.1 | 111.3 | 110.2 | 108.9 | | |
| ΔHf (cal/g) | 33.4 | 31.7 | 33.1 | 33.2 | 32.3 | 32.4 | 33.5 | 37.4 | 37.0 |
| CCLDI | 7.7 | 4.9 | 4.1 | 13.8 | 11 | 4.8 | 4.1 | 7.3 | 7.4 |

We claim:

1. An ethylene inter-polymer composition comprising:
   a) less than 30 weight percent of at least one first ethylene inter-polymer having;
      i) a branching factor greater than 0.5 or less than 0.7;
      ii) a CCLDI greater than 1.5 or less than 3.0;
      iii) a PDI greater than 4 or less than 10;
      iv) an nRSI greater than 32; and
   b) greater than 70 weight percent of at least one second ethylene inter-polymer, said at least one second ethylene inter-polymer having;
      i) a branching factor greater than 0.95;
      ii) CCLDI greater than 1.8 or less than 15;
      iii) a PDI greater than 4.0 or less than 6.0;
      iv) an nRSI greater than 1.8 or less than 5.5;
   said weight percentages based on the total weight of said composition, wherein film made from the composition has a haze less than or equal to 4%, as determined by ASTM D-1003, an Elmendorf tear (MD) above 130 g/mil, as determined by ASTM D-1922, and a dart drop impact greater than 300 g/mil, as determined by ASTM D-1709.

2. An ethylene inter-polymer composition comprising:
   a) less than 30 weight percent of at least one first ethylene inter-polymer having;
      i) a branching factor greater than 0.5 or less than 0.7;
      ii) a CCLDI greater than 1.5 or less than 3.0;
      iii) a PDI greater than 4 or less than 10;
      iv) an nRSI greater than 32; and
   b) greater than 70 weight percent of at least one second ethylene inter-polymer, said at least one second ethylene inter-polymer having;
      i) a branching factor greater than 0.7;
      ii) CCLDI greater than 1.8 or less than 15;
      iii) a PDI greater than 1.5 or less than 6.0;
      iv) an nRSI greater than 1.8 or less than 11;
   said weight percentages based on the total weight of said composition, wherein film made from the composition has a haze less than or equal to 4%, as determined by ASTM D-1003, an Elmendorf tear (MD) above 130 g/mil, as determined by ASTM D-1922, and a dart drop impact greater than 300 g/mil, as determined by ASTM D-1709.

3. An ethylene inter-polymer film comprising:
   a) less than 50 weight percent of at least one first ethylene inter-polymer having:
      i) a branching factor less than 0.7;
      ii) a CCLDI less than 10;
      iii) a PDI less than 15;
      iv) an nRSI greater than 26; and
   b) greater than 50 weight percent of at least one second ethylene inter-polymer, said at least one second ethylene inter-polymer having:

i) a branching factor greater than 0.7;
ii) a CCLDI less than 20;
iii) a PDI less than 6;
iv) an nRSI less than 11;
    wherein said weight percentages are based on the total weight of said at least one first and at least one second ethylene inter-polymers;
wherein said film has a haze less than or equal to 7%.

4. The ethylene inter-polymer film of claim 3, wherein said first ethylene inter-polymer is present in said film at less than 40 weight percent, and said second ethylene inter-polymer is present in said film at greater than 60 weight percent, said weight percents based on the total weight of said film, and wherein said film has a haze less than or equal to 6%.

5. The ethylene inter-polymer film of claim 3, wherein said first ethylene inter-polymer is present in said film at less than 35 weight percent, and said second ethylene inter-polymer is present in said film at greater than 65 weight percent, said weight percents based on the total weight of said film, and wherein said film has a haze less than or equal to 5%.

6. The ethylene inter-polymer film of claim 4, wherein said film has an Elmendorf tear (MD) above 80 g/mil, wherein said film has a dart drop impact greater than 100 g/mil, and wherein said film has a haze of less than or equal to 4%.

7. The ethylene inter-polymer film of claim 5, wherein said film has an Elmendorf tear (MD) above 110 g/mil, and wherein said film has a dart drop impact greater than 200 g/mil.

8. The ethylene inter-polymer film of claim 5, wherein said film has an Elmendorf tear (MD) above 130 g/mil, wherein said film has a dart drop impact greater than 300 g/mil, and wherein said film has a haze of less than or equal to 4%.

9. The ethylene inter-polymer film of claim 7, wherein said first ethylene inter-polymer has an nRSI greater than 28, CCLDI less than 5.0, and a to PDI less than 12; and wherein said second ethylene inter-polymer is one of a second ethylene inter-polymer having has a CCLDI less than 15, an nRSI greater than 1.8 or less than 11, and a PDI greater than 1.5 or less than 4, or a second ethylene inter-polymer having has a CCLDI less than 15, an nRSI greater than 1.8 or less than 5.5, and a PDI greater than 4.0 or less than 6.0, or a combination of these second ethylene polymers.

10. The ethylene inter-polymer of claim 9 wherein said first ethylene inter-polymer has an nRSI greater than 28, CCLDI less than 3.0, and a PDI less than 10.

11. An ethylene inter-polymer blend comprising:
less than 50 weight percent of a first ethylene inter-polymer, said first ethylene inter-polymer has a branching factor greater than 0.4, or less than 0.7; a PDI greater than 3, or less than 15; an nRSI greater than 26; and a CCLDI greater than 1.0, or less than 10.0;
greater than 50 weight percent of a second ethylene inter-polymer having a branching factor greater than 0.7; a PDI greater than 1.5, or less than 6; an nRSI greater than 1, or less than 11; and a CCLDI greater than 1, or less than 20.

12. The ethylene inter-polymer blend of claim 11 wherein said first ethylene inter-polymer is present in said blend at less than 40 weight percent, and has a branching factor greater than 0.5, or less than 0.7; a PDI greater than 3, or less than 12; an nRSI greater than 28; and a CCLDI greater than 1.2, or less than 5;
said second ethylene inter-polymer is present in said blend greater than 60 weight percent, has a CCLDI greater than 1, or less than 15; and is one of a second ethylene inter-polymer, having a branching factor greater than 0.70; a PDI greater than 1.5, or less than 6; an nRSI greater than 1.8, or less than 11; a second ethylene inter-polymer having a branching factor greater than 0.9; a PDI greater than 2.0, or less than 6.0; an nRSI greater than 1, or less than 5.5; or combinations of each of said second ethylene inter-polymers.

13. The ethylene inter-polymer blend of claim 11 wherein said first ethylene inter-polymer is present in said blend at less than 30 weight percent, and has a branching factor greater than 0.5, or less than 0.7; a PDI greater than 4, or less than 10; an nRSI greater than 30; and a CCLDI greater than 1.5, or less than 3;
said second ethylene inter-polymer is present in said blend greater than 70 weight percent, has a CCLDI greater than 1.8, or less than 15; and is one of a second ethylene inter-polymer, having a branching, factor greater than 0.8, or less than 0.9; a PDI greater than 1.5, or less than 4; an nRSI greater than 1.8, or less than 11; a second ethylene inter-polymer having a branching factor greater than 0.95; a PDI greater than 4.0, or less than 6.0; an nRSI greater than 1.8, or less than 5.5; or combinations of each of said second ethylene inter-polymers.

14. A film including the ethylene inter-polymer blend of claims 11, 12, or 13, wherein said film has a haze less than or equal to 7%, as determined by ASTM D-1003, an Elmendorf tear (MD) above 80 g/mil, as determined by ASTM D-1922, and wherein said film has a dart drop impact greater than 100 g/mil, as determined by ASTM D-1709.

15. A film including the ethylene inter-polymer blend of claims 11, 12, or 13, wherein said film has a haze less than or equal to 6%, as determined by ASTM D-1003, an Elmendorf tear (MD) above 110 g/mil, as determined by ASTIM D-1922, and wherein said film has a dart drop impact greater than 200 g/mil, as determined by ASTM D-1709.

16. A film including the ethylene inter-polymer blend of claims 11, 12, or 13, wherein said film has a haze less than or equal to 5%, as determined by ASTM D-1003, an Elmendorf tear (MD) above 130 g/mil, as determined by ASTM D-1922, and wherein said film has a dart drop impact greater than 300 g/mil, as determined by ASTM D-1709.

17. An ethylene inter-polymer composition comprising:
a) a first ethylene inter-polymer, present in said blend at less than 30 weight percent based on the total weight of said blend composition, said first ethylene inter-polymer having:
    i. a branching factor greater than 0.5, or less than 0.7;
    ii. a CCLDI greater than 1.5, or less than 3.0;
    iii. a PDI of greater than 4, or less than 10;
    iv. an nRSI greater than 32; and
b) a second ethylene inter-polymer present in said blend greater than 70 weight percent based on the total weight of said blend composition, said second ethylene inter-polymer having a CCLDI greater than 1.8, or less than 15; said second ethylene inter-polymer being one of a second ethylene inter-polymer wherein said second ethylene inter-polymer has a branching factor greater than 0.8, or less than 0.9; a PDI of greater than 1.5, or less than 4; an nRSI of greater than 1.8. or less than 11; a second ethylene inter-polymer having a branching, factor greater than 0.95; a PDI greater than 4, or less than 6; and an NRSI of greater than 1.8, or less than 5.5; or combinations 1.5 thereof.

* * * * *